United States Patent [19]
Kuze

[11] Patent Number: 5,519,932
[45] Date of Patent: May 28, 1996

[54] MULTI-STAGE AUTOMATIC PRESS AND ASSEMBLY MACHINE

[76] Inventor: Yoshikazu Kuze, 31-3, Higashimagome, 1-chome, Ohta-ku, Tokyo, Japan

[21] Appl. No.: 262,640

[22] Filed: Jun. 20, 1994

[30] Foreign Application Priority Data

Jun. 21, 1993 [JP] Japan .................... 5-187689

[51] Int. Cl.⁶ .................................................. B23P 11/00
[52] U.S. Cl. .................. 29/564.1; 29/706; 29/771; 29/788; 29/818; 72/4; 72/405.14
[58] Field of Search .................... 72/405, 421, 4; 198/621; 470/109, 154; 29/563, 564.1, 706, 771, 788, 818

[56] References Cited

U.S. PATENT DOCUMENTS

| | | | |
|---|---|---|---|
| 2,155,958 | 4/1939 | Schmidt | 29/788 |
| 3,077,660 | 2/1963 | Essenberg | 29/788 |
| 3,319,087 | 5/1967 | Wintriss | 72/4 |
| 3,656,139 | 4/1972 | Wintriss | 72/4 |
| 3,683,482 | 8/1972 | Gluchowski | 29/818 |
| 3,798,736 | 3/1974 | Gibbons | 29/564.1 |
| 3,939,992 | 2/1976 | Mikulec | 214/1 BB |
| 4,178,672 | 12/1979 | Amico | 29/788 |
| 4,257,153 | 3/1981 | Amico | 29/818 |
| 4,393,682 | 7/1983 | Imanishi | 72/405 |
| 4,454,743 | 6/1984 | Bulso | 72/405 |
| 4,462,521 | 7/1984 | Takagi | 198/621 |
| 5,076,083 | 12/1991 | Kuze | 72/405 |

FOREIGN PATENT DOCUMENTS

| | | | |
|---|---|---|---|
| 0405894 | 1/1991 | European Pat. Off. . | |
| 1170893 | 5/1964 | Germany | 72/4 |
| 226325 | 10/1991 | Japan | 72/4 |
| 984585 | 1/1983 | U.S.S.R. . | |

*Primary Examiner*—Daniel C. Crane
*Attorney, Agent, or Firm*—Flynn, Thiel, Boutell & Tanis

[57] ABSTRACT

A press and assembly machine has a die set which has guide posts securely mounted on a base plate, and a cylinder plate securely mounted on top portions of the guide posts, and a movable plate slidably mounted on the guide posts. A cylinder is mounted on the cylinder plate. A piston rod of the cylinder is connected to the movable plate. A pick-and-place device is mounted on the base plate. The pick-and-place device comprises a pair of guide rails mounted on the base plate at opposite sides of the lower die, opposite sliding members slidably mounted on the guide rails, a connecting member connecting the sliding members, a reciprocating cylinder for reciprocating the connected sliding members, and a plurality of gripping actuators provided on the opposite sliding members. The gripping actuator has opposite gripping cylinders, opposite gripping fingers operated by a piston rod of the corresponding cylinder for gripping a work. A parts-feeder is provided for feeding works one by one to the pick-and-place device. A sequence controller is provided for sequentially operating the machine for progressively pressing and assembling works.

11 Claims, 15 Drawing Sheets

5,519,932

MULTI-STAGE AUTOMATIC PRESS AND ASSEMBLY MACHINE

BACKGROUND OF THE INVENTION

The present invention relates to a progressive automatic press and assembly machine. The machine is provided with a multi-stage pick-and-place device for progressively feeding a work and taking out a processed work, and is automatically operated by a sequence controller.

A power press machine with progressive dies is conventionally used to produce a work from hoop material fed with a roller feeder. In general, the work is progressively transferred by a robot. Accordingly, the press machine is comparatively complicated in construction and costly.

SUMMARY OF THE INVENTION

An object of the present invention is to provide a progressive multi-stage press machine using a die set with an actuator and having a progressive pick-and-place device, whereby the machine may be simplified in structure, reduced in size and weight, and manufactured at a low cost.

A press machine according to the present invention is composed based on a die set and provided with a pneumatic or hydraulic cylinder, and a pick-and-place device for progressively supplying a work to the press machine and taking out a finished work, and a read-only sequence controller for automatically operating the press machine.

According to the present invention, there is provided a press and assembly machine with a die set having a base plate, vertical guide posts securely mounted on the base plate, a horizontal cylinder plate securely mounted on top portions of the guide posts, a movable plate, slidably mounted on said guide posts.

The press and assembly machine comprises a cylinder vertically mounted on the cylinder plate, the press cylinder having a piston rod which is connected to the movable plate. A pick-and-place device is mounted on the base plate.

The pick-and-place device comprises a pair of guide rails mounted on the base plate at opposite sides of the lower die, opposite sliding members slidably mounted on the guide rails, a connecting member connecting the sliding members, a reciprocating cylinder for reciprocating the connected sliding members, and a plurality of gripping actuators provided on the opposite sliding members.

The gripping actuator has opposite gripping cylinders, opposite gripping fingers, operated by a piston rod of the corresponding cylinder for gripping a work.

A parts-feeder is provided at an inlet side of the press machine for feeding the work one by one to the pick-and-place device.

A sequence controller is provided for operating the press machine and the pick-and-place device to perform progressive feeding of works.

A lifting device is provided for lifting the pick-and-place device. The lifting device has lifting cylinders provided on the base plate, a piston rod of each of the lifting cylinders being connected to the corresponding guide rail for lifting the guide rail.

The sequence controller comprises a main circuit and a sub-circuit operated by a command signal from the main circuit at a predetermined cycle time. The cycle time of the main circuit is longer than the sub-circuit in order to control the sub-circuit. A sensor is provided on an outlet of the machine for detecting a discharge of the work at every cycle end and producing a discharge signal which is fed to the sub-circuit. In normal operation, the sub-circuit is re-started by the command signal from the main circuit. When abnormality occurs, the sensor does not produce the discharge signal and a stop control circuit produces stop signals to stop the main circuit and the sub-circuit. The machine is stopped at the top dead center.

The present invention further provides a press and assembly line comprising a plurality of multi-stage press and assembly machines which are connected in series.

In accordance with the present invention a multi-stage progressive cold forging press machine, a multi-stage progressive power press machine can be provided, and a press and assembly line can be provided.

Each of the cold forging and power press machines comprises a parts-feeder provided at an inlet thereof, a die set having a pick-and-place device for progressively transferring works, a base plate secured to a holster of the press machine, and a movable plate secured to a slider of the press machine, a sensor provided on a discharge shoot for detecting and the discharging of a product, and a sequence controller mounted on the press machine for controlling operation of the press machine.

The press and assembly line comprises a multi-stage progressive cold forging press machine, and a plurality of multi-stage press and assembly machines connected in series to the cold forging press machine at an outlet of the shoot.

These and other objects and features of the present invention will become more apparent from the following detailed description with reference to the accompanying drawings.

DETAILED DESCRIPTION OF THE PREFERRED EMBODIMENT

Figure 1:
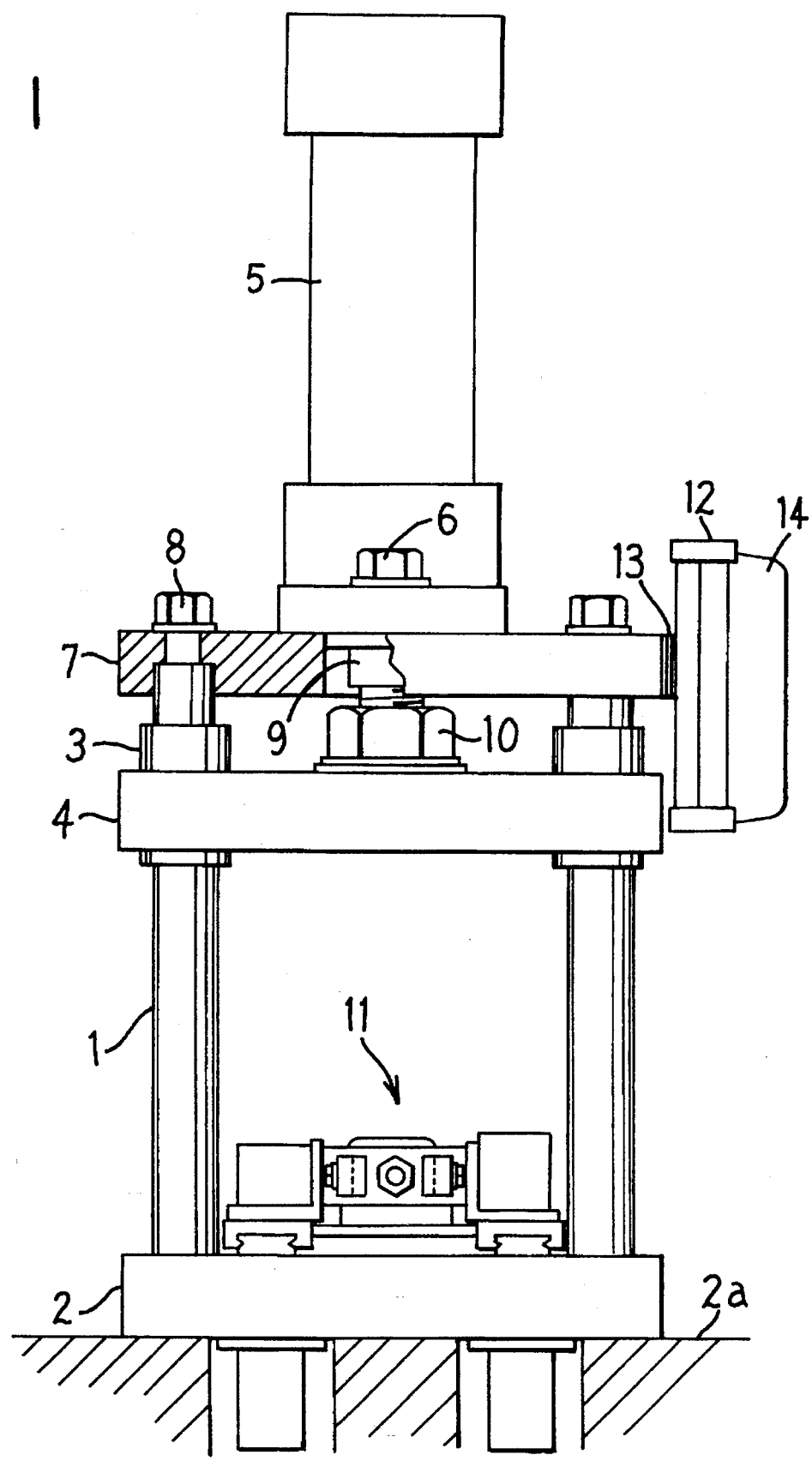
FIG. 1 is a side view of a press machine according to the present invention.
Figure 2:
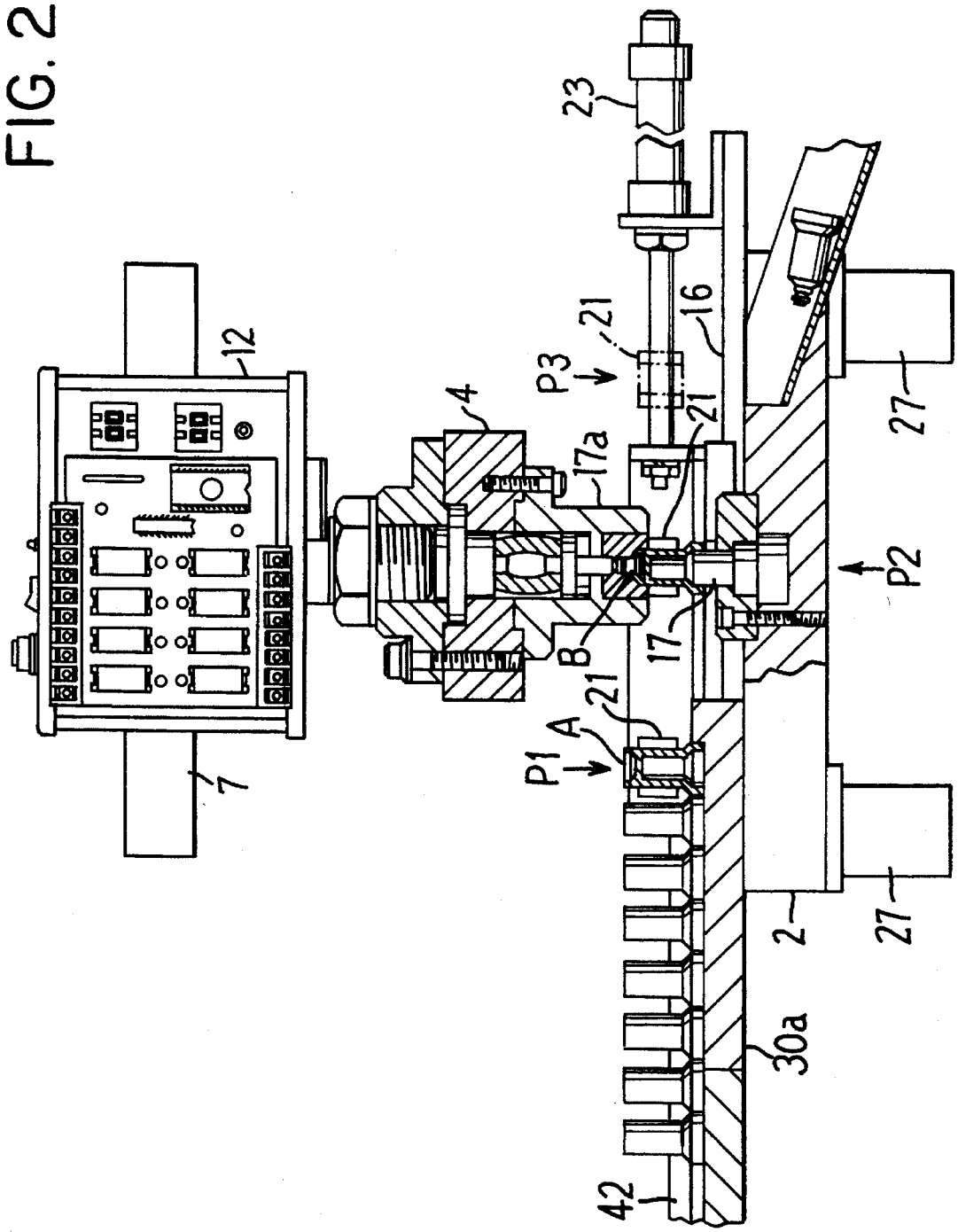
FIG. 2 is a front elevational view of the press machine.

Referring to FIGS. 1 and 2, two vertical guide posts 1 are securely mounted on a base plate 2 which is secured on a table 2a. A movable plate 4 is slidably mounted on the guide posts 1 by slidably engaging a guide bush 3 with each guide post 1. Thus, a conventional die set is composed by the four members 1, 2, 3 and 4. A horizontal cylinder plate 7 is secured to the guide post 1 at the top of each post and secured thereto by a screw 8. A hydraulic cylinder 5 such as an oil hydraulic cylinder or pneumatic cylinder is vertically mounted on the cylinder plate 7 and secured thereto by screws 6. A piston rod 9 of the cylinder 5 has a screw thread. The piston rod 9 is secured to the movable plate 4 by engaging the screw thread with a thread formed in the movable plate and locked by a lock nut 10. On the base plate 2, a lower die 17 is mounted and an upper die 17a is secured to the underside of the movable plate 4. Thus, by operating the cylinder 5, press work can be performed between the dies 17 and 17a. A read-only sequence controller 12 which is covered by a cover 14 is attached to the cylinder plate 7 through a connector 13 in order to automatically operate the press machine.

Mounted on the base plate 2 is a progressive multi-stage pick-and-place device 11 for supplying works A and B on the die 17 and for taking out a processed work.

Figure 3:
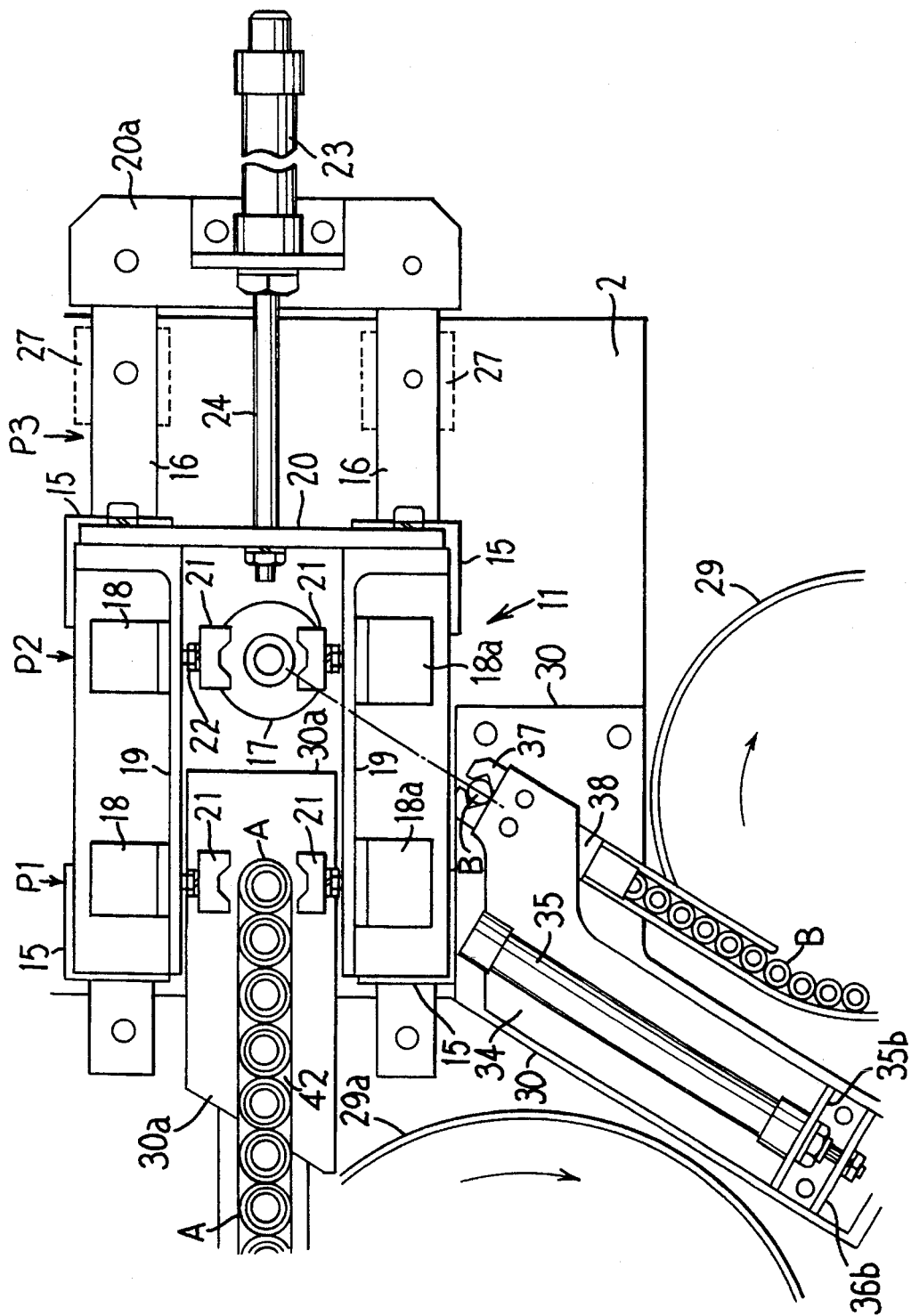
FIG. 3 is a plan view of a pick-and-place device.
Figure 4:
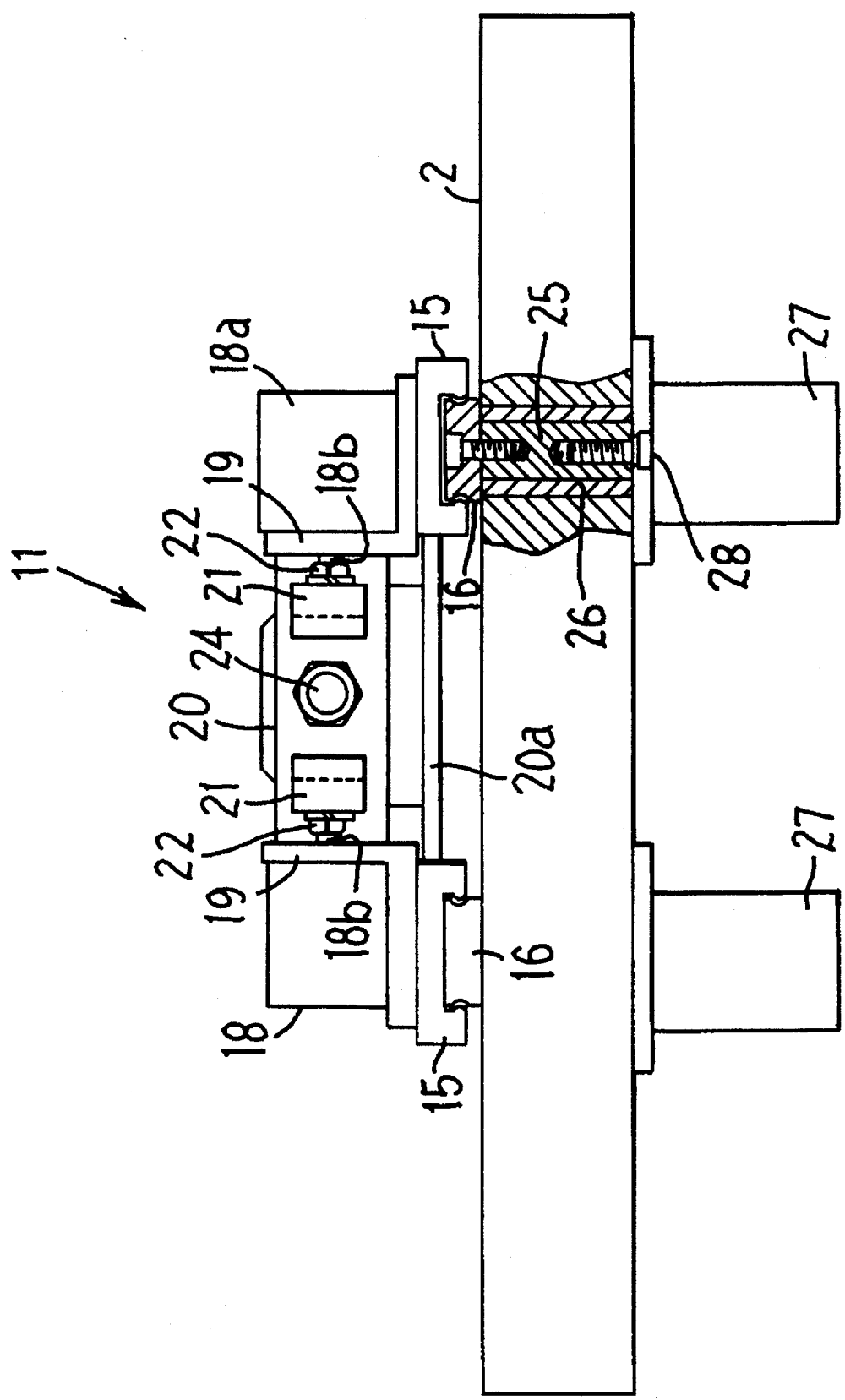
FIG. 4 is a side view showing a part of the pick-and-place device.

Referring to FIGS. 3 and 4 showing the pick-and-place device 11, a pair of slide guide rails 16 are mounted on the base plate 2 parallel with each other at the opposite sides of the lower die 17. A pair of slide blocks 15 are slidably mounted on each of the guide rails 16 at a predetermined distance therebetween. An L-shaped supporting plate 19 is secured to each pair of slide blocks 15. Two pairs of gripping actuators are provided on the supporting plates 19. Each gripping actuator comprises opposite pneumatic cylinders 18 and 18a secured to the opposite supporting plates 19. The cylinders 18 and 18a are positioned on a first position P1 and a second position P2 at a predetermined equidistance, respectively. The ends of the supporting plates 19 are connected by a connecting plate 20.

Opposite gripping fingers 21 are secured to piston rods 18b of cylinders 18 and 18a of each of the gripping actuators and by nuts 22 for gripping a work A.

A supporting plate 20a is secured to the ends of the slide guide rails 16. A pneumatic cylinder 23 is secured to the supporting plate 20a and a piston rod 24 is connected to the connecting plate 20. Thus, the cylinders 18 and 18a on the supporting plates 19 are reciprocated on the slide guide rails 16 between the positions P1, P2 and P3 by the operation of the cylinder 23, which will be described hereinafter in detail.

As shown in FIG. 4, on the underside of the slide guide rail 16, a pair of lifting devices for lifting the pick-and-place device 11 are provided. Each of the lifting devices has a guide post 25 which is secured to the guide rail 16 and slidably engaged in a guide bush 26 embedded in the base plate 2 by force fitting. A vertical pneumatic cylinder 27 is secured on the underside of the base plate 2, corresponding to each of the guide posts 25 and a piston rod 28 of the cylinder 27 is connected to the guide post 25. Thus, the slide guide rails 16 are vertically moved by the operations of the cylinders 27.

Figure 5:
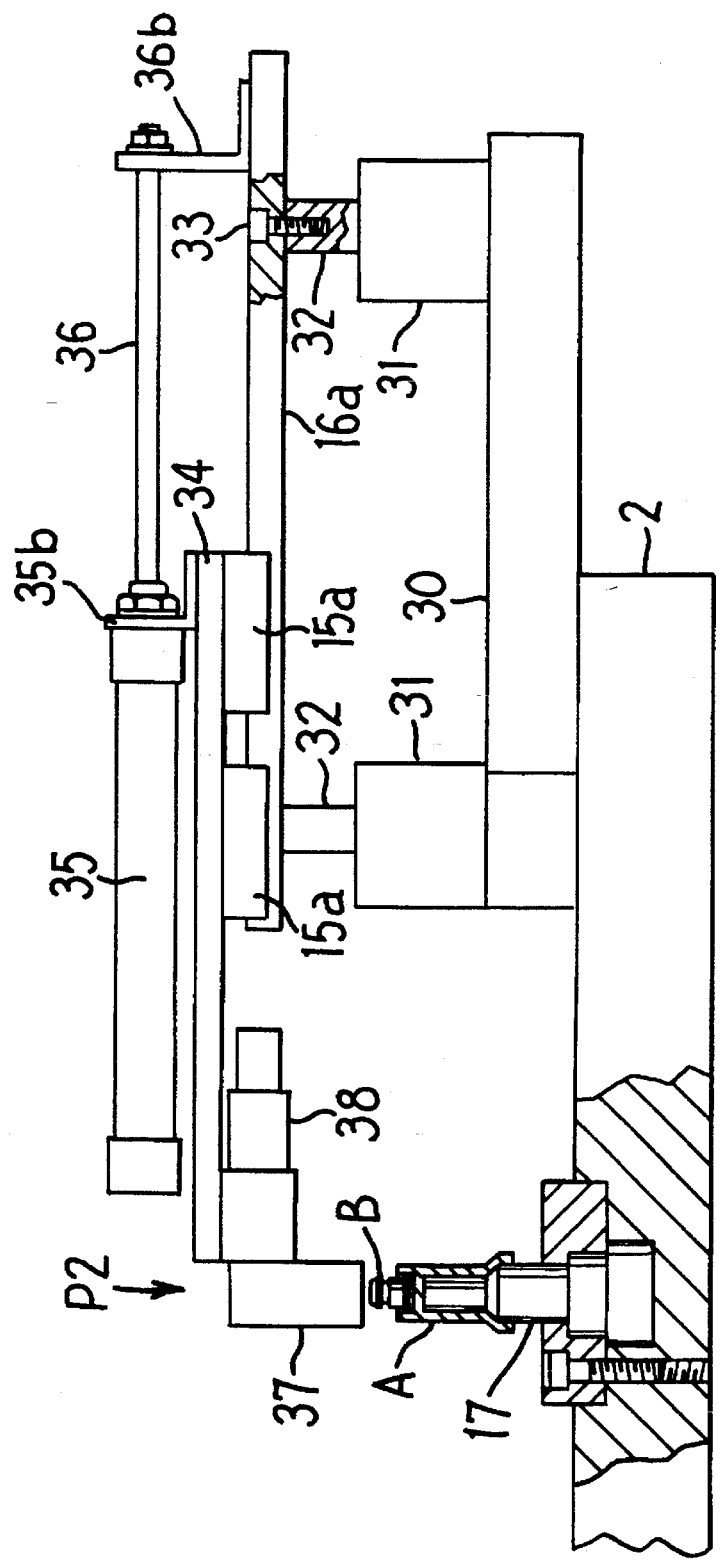
FIG. 5 is a side view showing another part of the pick-and-place device.

Referring to FIGS. 3 and 5, a parts-feeder 29 is provided for automatically lining up a plurality of works B. A pair of vertical pneumatic cylinders 31 are secured on a holding plate 30 which is securely mounted on the base plate 2. A slide guide rail 16a is secured to piston rods 32 of the cylinders 31 by screws 33. A pair of slide blocks 15a are slidably mounted on the slide guide rail 16a. A supporting plate 34 is secured to the slide blocks 15a. A horizontal pneumatic cylinder 35 is secured to the supporting plate 34 through a connecting plate 35b, and a piston rod 36 of the cylinder 35 is connected to the slide guide rail 16a through a connecting plate 36b. On the underside of the supporting plate 34, a horizontal pneumatic cylinder 38 having a chuck 37 is secured.

The chuck 37 is opened in a normal state. The chuck is closed for gripping the work B and opened again for releasing the work in accordance with the operation of the cylinder 38.

A sequential operation of the press machine will be described hereinafter.

The work A is a heat conductive cylinder for a thermo-actuator provided in a wax-pellet thermostat for a cooling system of an automotive engine.

Figure 9:
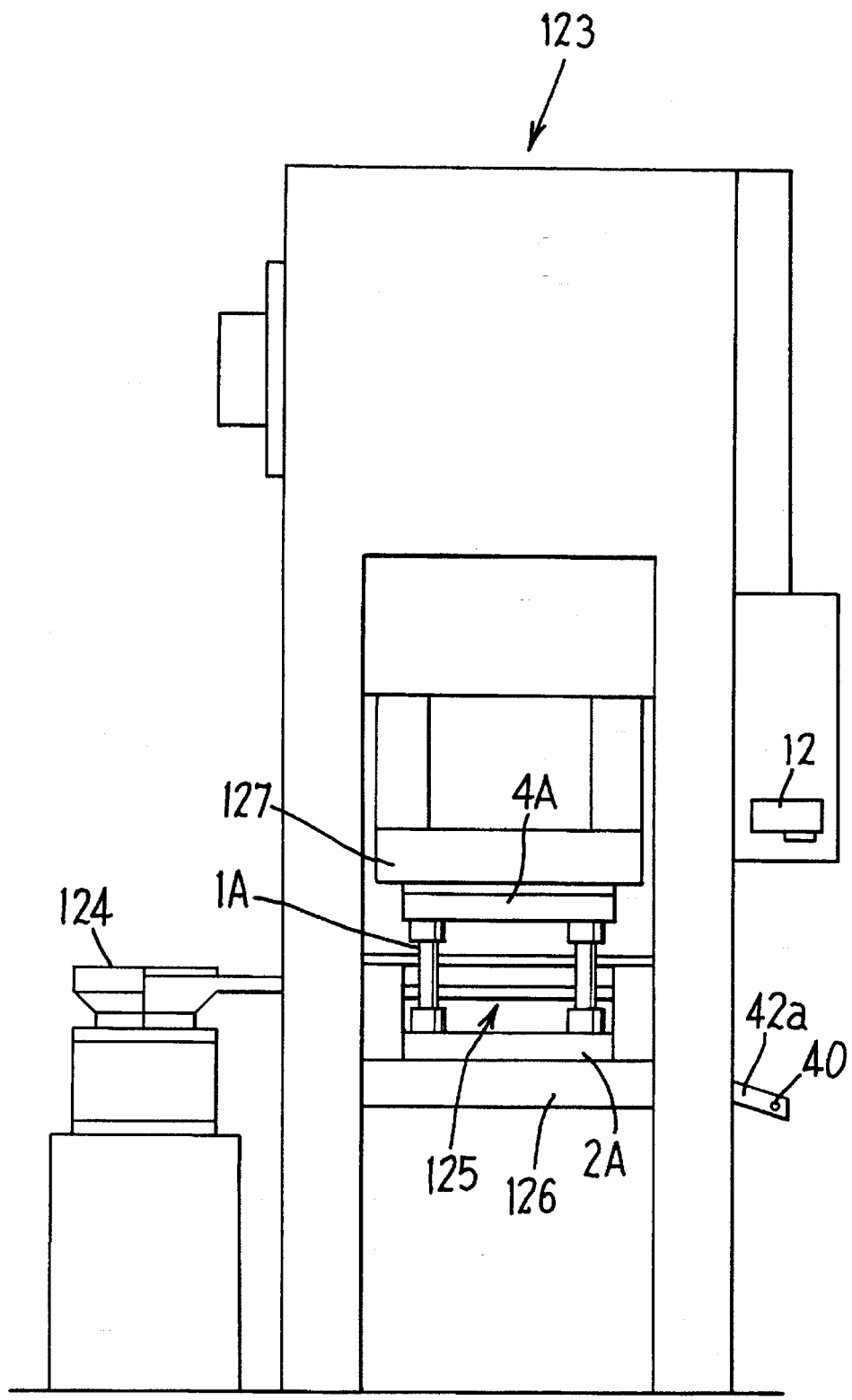
FIG. 9 is a front view showing a second embodiment of the present invention.

FIG. 9 shows a cold forging automatic press machine of a capacity of 160t according to the present invention for producing the works A. The press machine 123 has a parts-feeder 124 and a die set 125 provided with a pick-and-place device according to the present invention. A base plate 2A of the die set 225 is slidably mounted on guide posts 1A and secured to a bolster 126, and a movable plate 4A of the die set is secured to a slider 127 of the press machine. A sensor 40 is provided on a shoot 42a and the sequence controller 12 is mounted on the machine. Thus, a progressive multi-stage cold forging press machine is formed.

The machine is sequentially operated at three processes with a full automatic control to press a bar material of copper of 15 mm in outer diameter and 14 mm in length to produce cylindrical works A.

Figure 10:
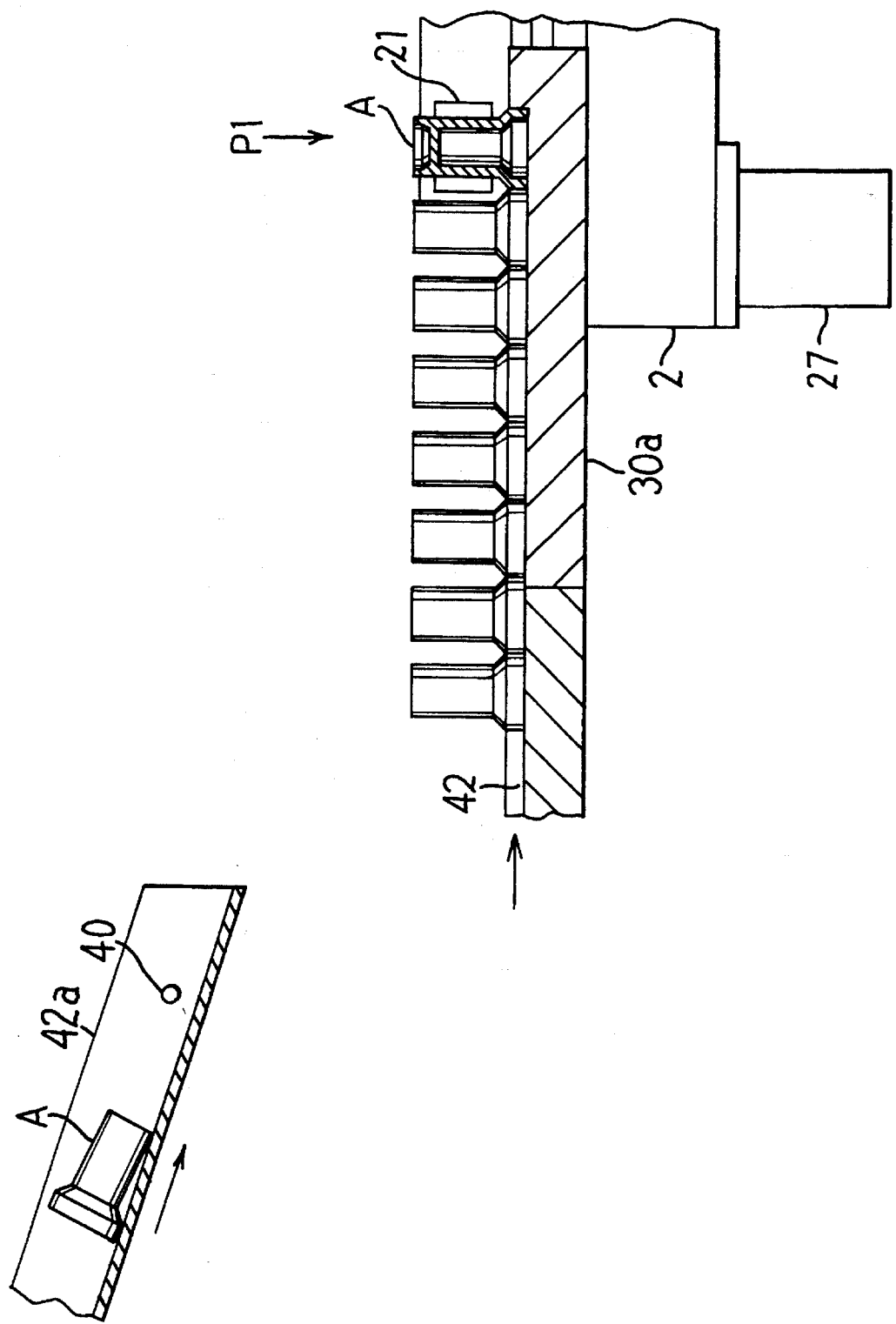
FIG. 10 is a schematic view showing a work fed to the pick-and-place device.

As shown in FIG. 10, the works A are fed by the shoot 42a of the cold forging automatic press machine to a parts-feeder 29a (FIG. 3) and lined up in a guide groove 42 formed on a guide plate 30a mounted on the base plate 2. The head of the works A is stopped at the first position P1.

Referring to FIG. 3, the slide guide rails 16 are lowered by the operations of cylinders 27 to lower the cylinders 18 and 18a, and the piston rods 18b of the cylinders 18 and 18a are moved in the forward directions so that the corresponding fingers 21 are closed to grip the head work A in the guide groove 42 at the first position P1. Then, the slide guide rails 16 are upwardly moved and the cylinder 23 is operated to horizontally move the supporting plates 19 on the slides 15 along the guide rails 16. Thus, the cylinders 18 and 18a at the first position P1 are moved to the second position P2 and the cylinders 18 and 18a at the second position P2 are moved to the third position P3. The slide guide rails 16 are lowered again, at the position P2, the work A is engaged with the lower die 17, and then the piston rods 18b of the cylinders 18 and 81a are retracted so that the fingers 21 are disengaged from the work A. Thereafter, the cylinders 18 and 18a are raised and returned to the first position P1 and the second position P2, respectively.

In the cylinder device, automatic centering means is provided as described below.

The inner diameter of each of the cylinders 18a at a side of the machine is set to a larger value than that of the cylinder 18 at the other side, so that each cylinder 18a has a larger air pressure than that of the cylinder 18. Therefore, the work A engaged with the finger 21 of the cylinder 18a is not moved if the work A is pushed by the finger 21 of the cylinder 18. Namely, the position of the work A is determined by only the finger 21 of the cylinder 18a. Thus, the centering of the work is accurately determined with respect to the die 17 by the cylinder 18a. Consequently, the break of the die due to eccentric positioning of the work is prevented.

On the other hand, the slide guide rail 16a is lowered by the cylinders 31 to lower the cylinder 38 on the supporting plate 34. The chuck 37 operatively connected to the piston rod of the cylinder 38 grips the head work B and the guide rail 16a is upwardly moved. The supporting plate 34 on the slide blocks 15a is horizontally moved along the guide rail 16a by the operation of the cylinder 35 to the die 17. The guide rail 16a is lowered at the position P2 and the chuck 37 is opened so that the work B is inserted in the work A. Thereafter, the supporting plate 34 is returned to the initial position.

Subsequently, as shown in FIG. 2, the movable plate 4 is lowered by the operation of the hydraulic cylinder 5 to press the work B to the work A with the upper and lower dies 17 and 17a. Thus, the work B is press-fitted in the work A. Then, the plate 4 is upwardly moved.

Thereafter, the slide guide rails 16 are lowered. The fingers 21 of the cylinders 18 and 18a at the second position P2 grip the pressed work, and the fingers 21 of the cylinders 18 and 18a at the first position P1 grip the next work A. The supporting plates 19 are raised and moved to the right in FIG. 3 so that the cylinders 18 and 18a at the second position P2 are moved to the third position P3. Then the cylinders are lowered and the fingers are retracted. Thus, the pressed work is disengaged from the fingers 21 to be discharged in a shoot. At the same time, the cylinders 18 and 18a at the first position P1 are moved to the second position P2 where the next work A is engaged with the die 17 by the fingers 21.

The next work B is engaged in the work A and pressed by the dies 17 and 17a in the same manners as described hereinbefore.

Figure 11:
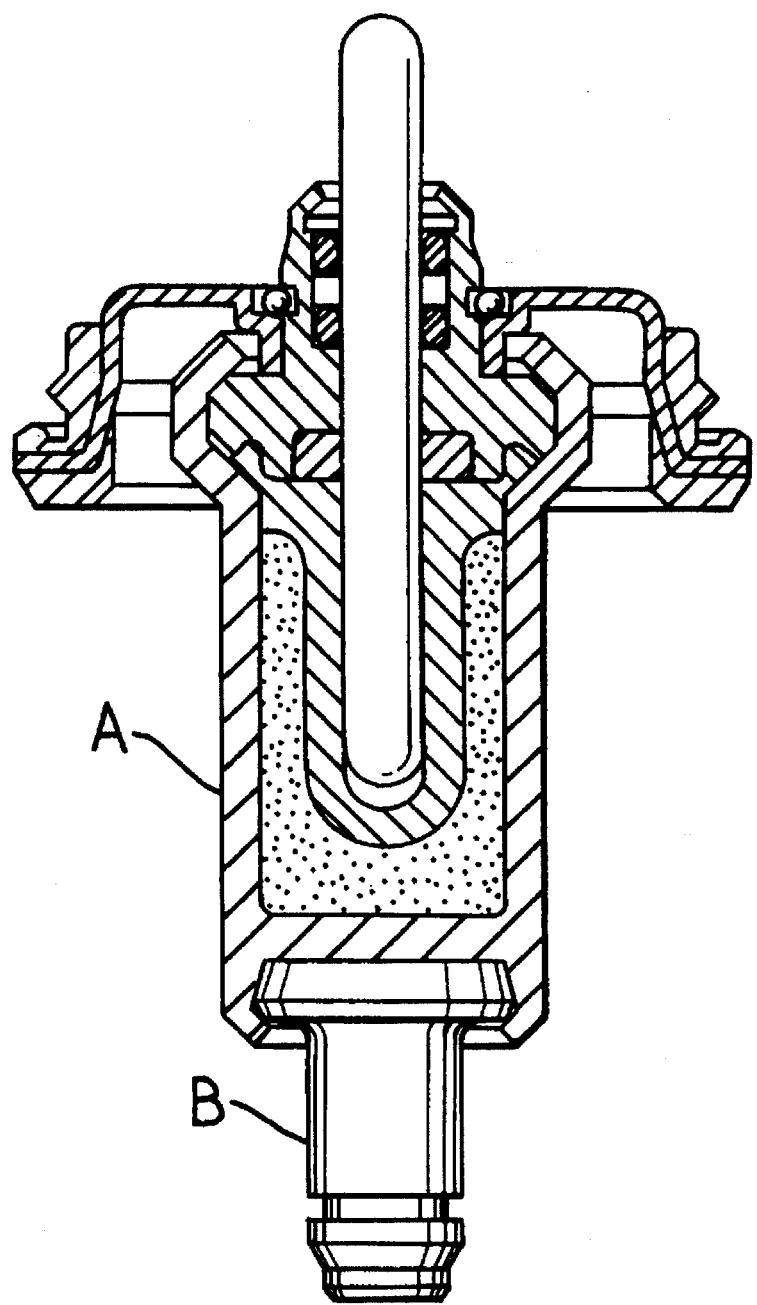
FIG. 11 is a sectional side view of a thermo-actuator.

FIG. 11 shows a thermo-actuator comprising works A A and B provided in a wax-pellet thermostat for a cooling system of an automotive engine.

By arranging a plurality of multi-stage press and assembly machines of the present invention in series, a progressive assembly line for manufacturing the thermostat can be composed.

Figure 12:
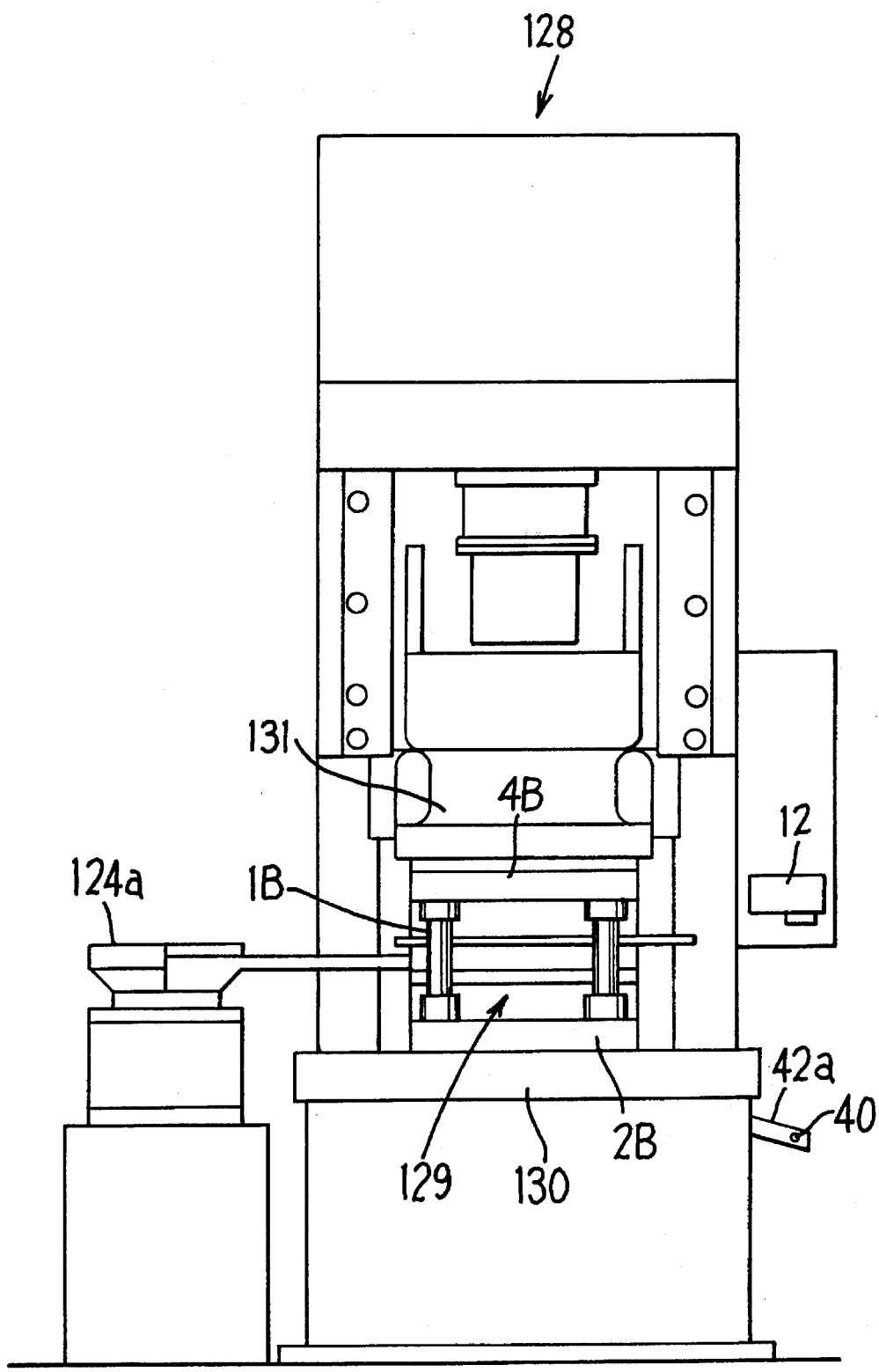
FIG. 12 is a front view of a third embodiment of the present invention.

FIG. 12 shows a power press machine 128 as a third embodiment of the present invention. The press machine 128 has a parts-feeder 124a at an inlet thereof and a die set 129 provided with a pick-and-place device according to the present invention. A base plate 2B of the die set 129 is secured to a bolster 130, and a movable plate 4B of the die set is slidably mounted on guide posts 1B and secured to a slider 131 of the power press machine. The sensor 40 is provided on the shoot 42a and the sequence controller 12 is mounted on the machine. Thus, a progressive multi-stage power press and assembly machine is formed.

The above described sequential operation is controlled by the read-only sequence controller 12.

Figure 13:
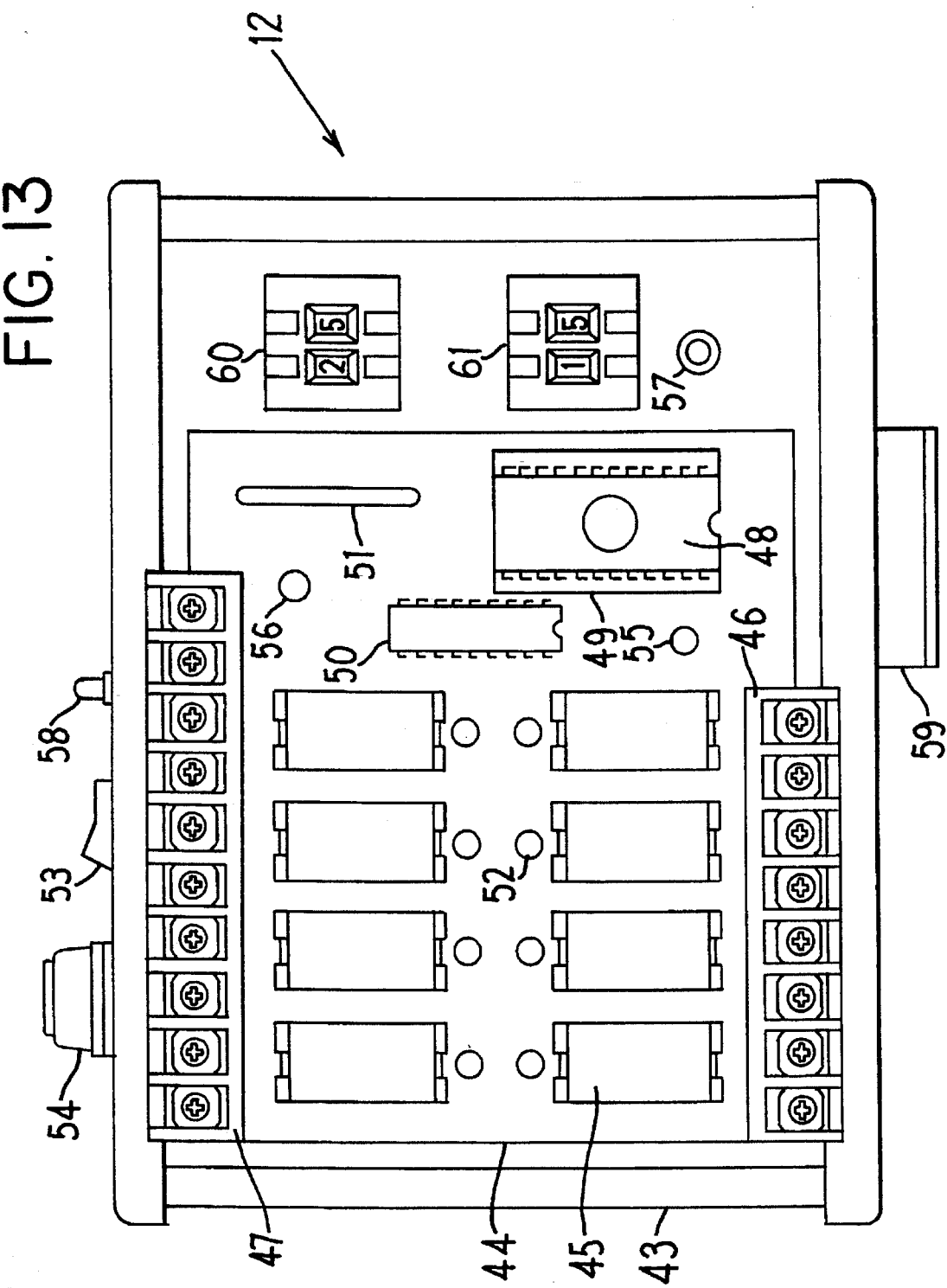
FIG. 13 is a front view of the read-only sequence controller.
Figure 14:
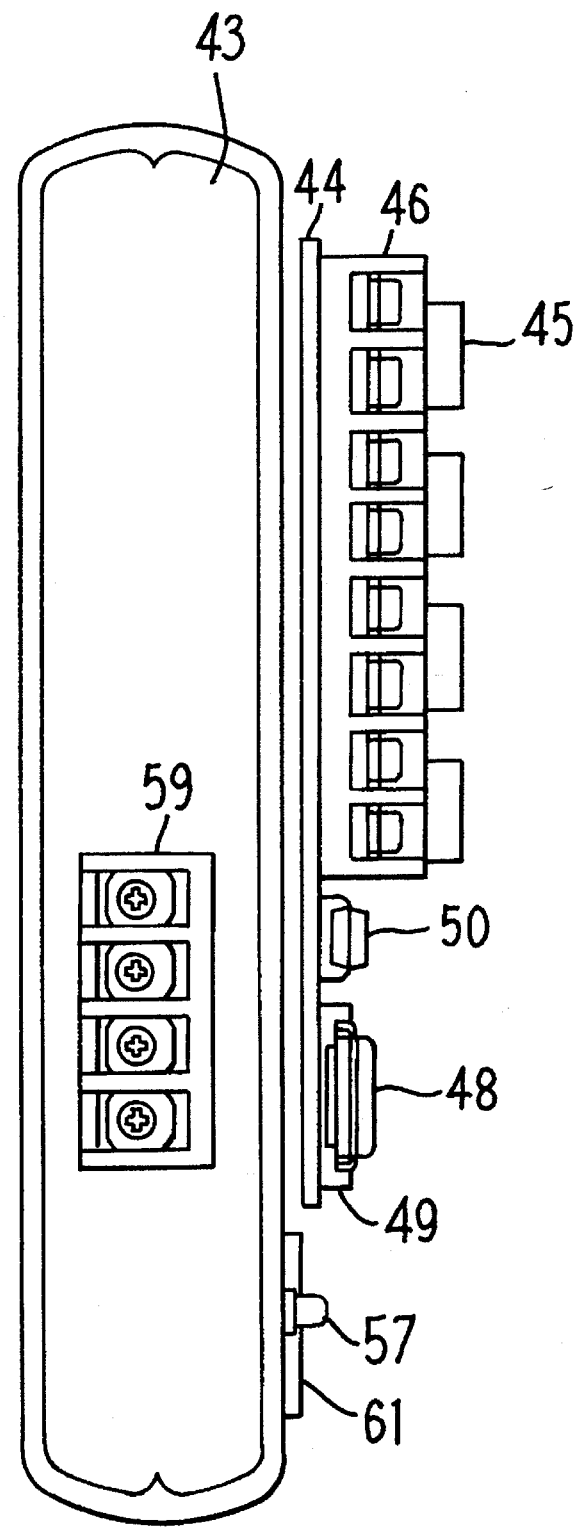
FIG. 14 is a side view of the sequence controller.

Referring to FIGS. 13 and 14, the read-only sequence controller 12 comprises a read clock pulse control unit 43 having a supply source and an output relay unit 44 mounted on the clock pulse control unit 43.

The output relay unit 44 comprises a board detachably secured to the control unit 43. A number of relays 45, such as eight relays are mounted on the board. Terminal units 46 and 47 are disposed adjacent to the relay unit 44. The terminal unit 46 has eight terminals for four relays and the terminal unit 47 has ten terminals for the other four relays and for an alternating current power supply. An EPROM 48 is detachably fixed to a connector 49. Numeral 50 is a transistor array, and 51 is a connector for the clock pulse control unit 43 and the output relay unit 44. Eight displays 52, each comprising an LED are provided for displaying the operation of each relay.

On the read clock pulse control unit 43, a power switch 53, fuse 54, pilot lamp 55 of an LED, abnormality display 56 of an LED, start switch 57, reset switch 58, input terminals 59, a preset code switch 60 for a main circuit A, and a preset code switch 61 for a sub-circuit B are provided. A program for controlling the above described sequential operation is stored in the EPROM 48.

Figure 6:
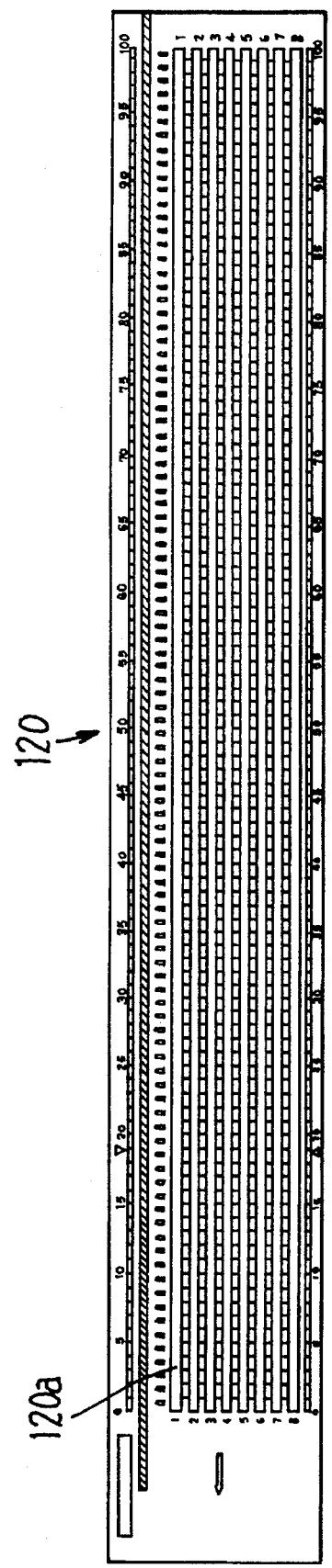
FIG. 6 shows a transparent program sheet of a read-only sequence controller.
Figure 7:
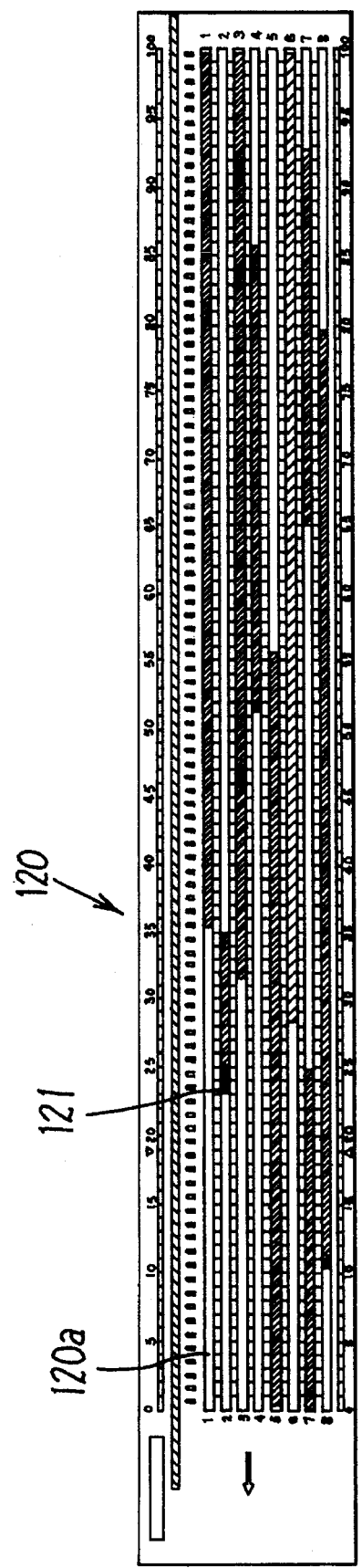
FIG. 7 shows a time chart attached by opaque tapes onto the transparent program sheet.

FIG. 6 shows a transparent program sheet 120 for storing a program. The sheet is provided with predetermined items such as parallel data lines 120a printed by opaque ink thereon. As shown in FIG. 7, a program comprising an eight-step time chart is formed by adhering opaque tapes 121 on the parallel data lines 120a.

In order to change the time chart, the opaque tape 121 is cut by a cutter. Thus, the time chart is easily changed.

Figure 8:
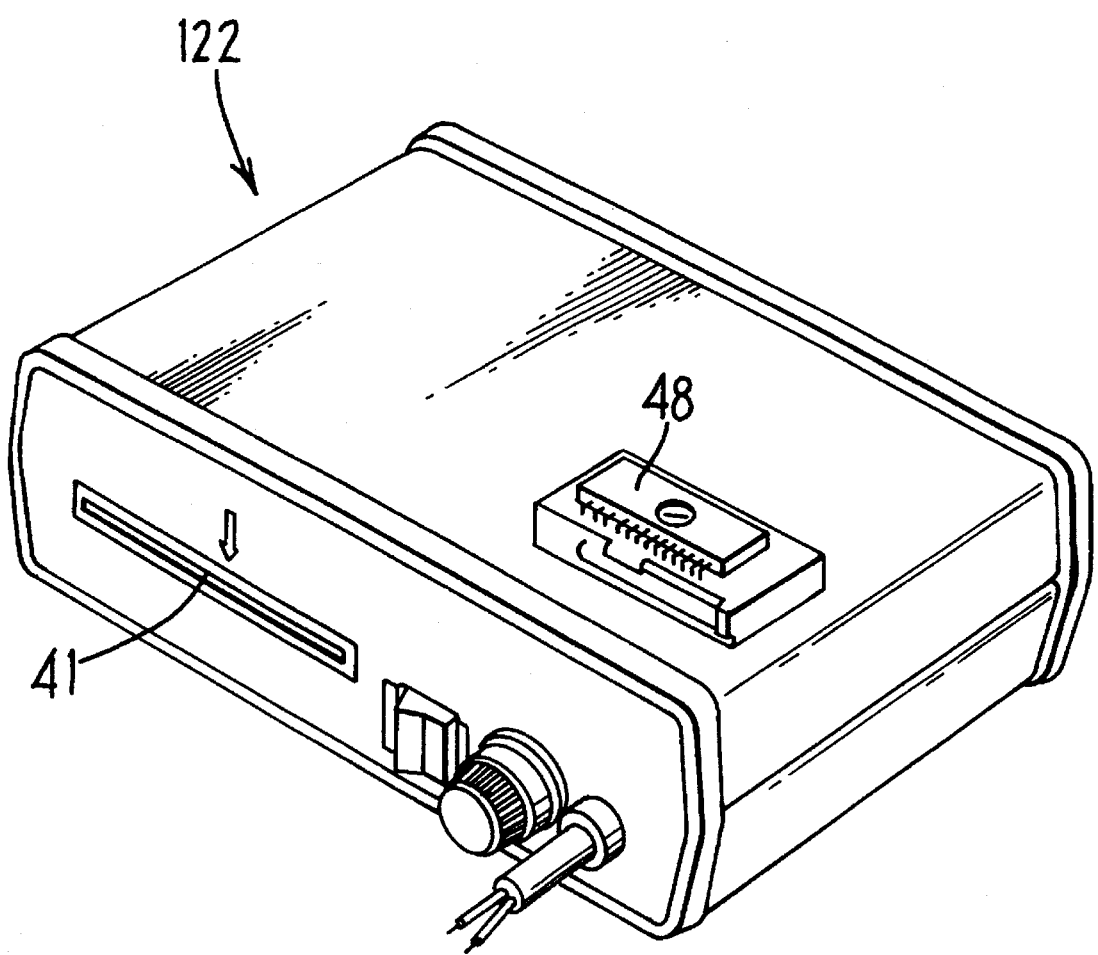
FIG. 8 is a perspective view showing an EPROM programmer.

FIG. 8 shows an EPROM programmer 122 for storing the program stored in the program sheet 120 in the EPROM 48. The program sheet 120 is inserted into an opening 41 of the programmer 122 and extracted from another opening (not shown) provided on an opposite side thereof. Thus, the data on the program sheet 120 is stored in the EPROM 48. The EPROM 48 is detachably fixed to the read-only sequence controller 12.

Figure 15:
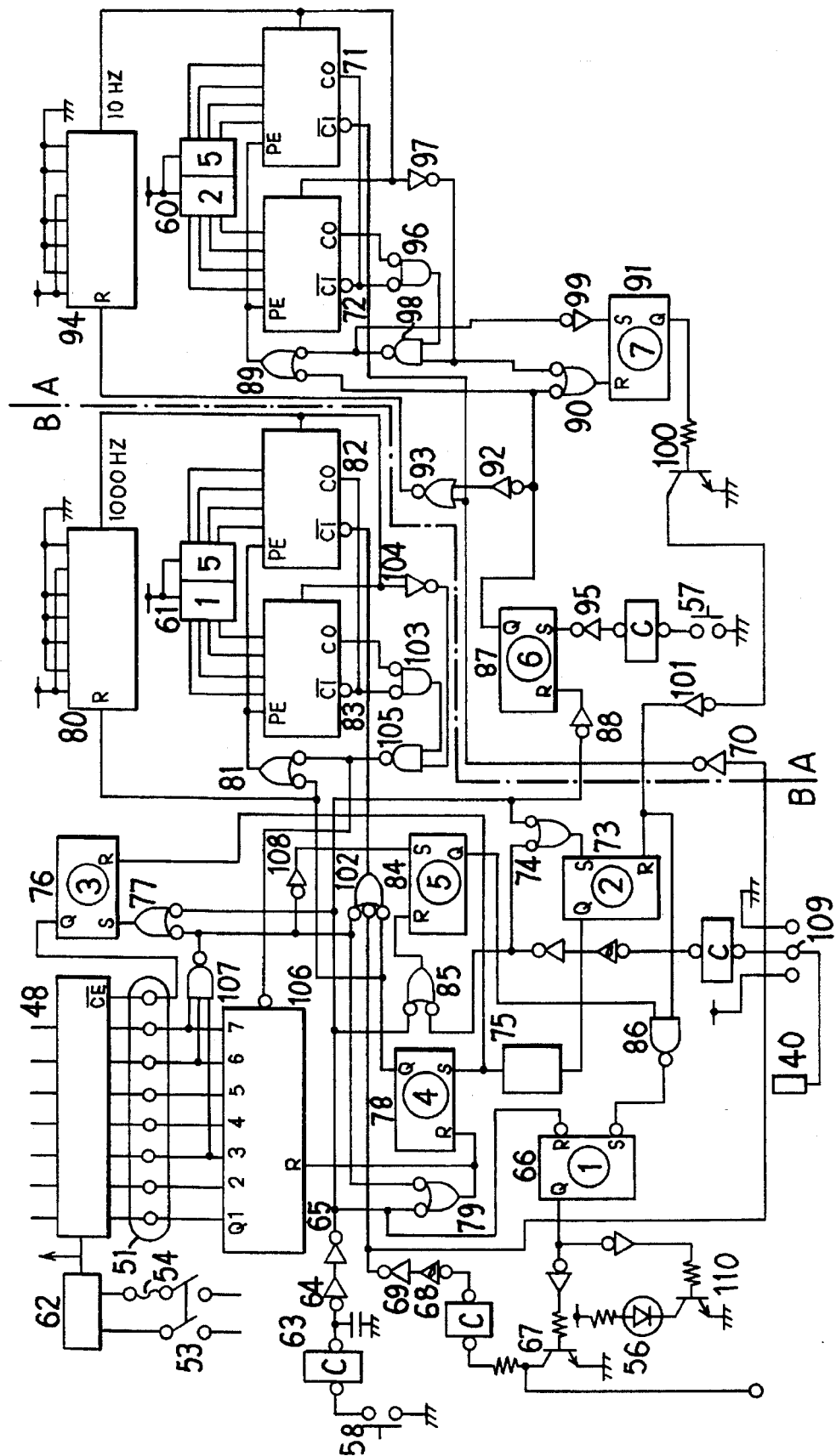
FIG. 15 shows a circuit of the sequence controller.

Referring to FIG. 15 showing a circuit of the controller, the circuit comprises the main circuit A and the sub-circuit B which are divided by a dot-dash line in FIG. 15. The cycle time of the main circuit A is set to 2.5 seconds by the present code switch 60. The cycle time of the sub-circuit B is set to 1.5 seconds by the preset code switch 61. When power switch 53 and reset switch 58 are depressed, the supply voltage Vcc is obtained by a switching regulator 62, and a system supply voltage is applied to an initial reset circuit 63, so that an inverter 64 produces an output at a 1 level. The output is inverted into a 0 level by an inverter 65 to reset or set each of R-S latches of first to sixth flip-flops.

When a first flip-flop 66 is reset, a transistor 67 is turned off, causing the output of an inverter 69 to go to 1 through a chatter preventing circuit C and Schmitt circuit 68. An output of an inverter 70 of the main circuit A is changed to "0" which is applied to a $\overline{CI}$ input of a presettable down counter 71 so that presettable down counters 71, 72 becomes count enable states.

A second flip-flop 73 is set through a 2-input NAND gate 74. A one-shot pulse "0" appears at an output of a one-shot pulse generating circuit 75.

When a third flip-flop 76 is set through a 2-input NAND gate 77, a 1 output is applied to an input $\overline{CE}$ of the EPROM 48 through the connector 51 so that the EPROM 48 stops producing data.

When a fourth flip-flop 78 is reset through a 2-input NAND gate 79, the output at a 0 level is applied to a reset input R of a clock pulse generating circuit 80 to stop the operation thereof. The 0-level output is further applied to inputs PE of presettable down counters 82 and 83 through a 2-input NAND gate 81 to preset the digit "15" of preset code switch 61 in counters 83 and 82, respectively.

When a fifth flip-flop 84 is reset through a 2-input NAND gate 85, an output at a 0 level is applied to a 2-input NAND gate 86 as an abnormality signal output gate.

When a sixth flip-flop 87 in the main circuit A is reset through an inverter 88, an output at a 0 level is produced, and an output at a 1 level is applied to inputs PE of presettable down counters 71 and 72 through a 2-input NAND gate 89 to preset the digit "25" of preset code switch 60 in counters 72 and 71, respectively.

The 0 output of the sixth flip-flop 87 is further applied to a seventh flip-flop 91 through a 2-input NAND gate 90 and to a clock pulse generating circuit 94 provided with a crystal oscillator through an inverter 92 and a 2-input NOR gate 93 to stop producing clock pulses.

When the start switch 57 of the main circuit A is depressed, the sixth flip-flop 87 is set through a chatter preventing circuit C and an inverter 95. Thus, an output at a 1 level is applied to the clock pulse generating circuit 94 through the inverter 92 and the 2-input NOR gate 93.

The output of the clock pulse generating circuit 94 provided with a crystal oscillator, is 10 Hz, as clock pulses. The clock pulses are applied to clock lines C of the presettable down counters 71 and 72, respectively.

Each time one clock pulse is applied to the presettable counter 71, the preset count therein decreases by one. When 25 clock pulses are applied to the presettable counters, both inputs of a 2-input NOR gate 96 go to a "0". Thus, the 2-input NOR gate 96 produces one read clock pulse.

On the other hand, when an inverter 97 produces output "1", a 2-input NAND gate 98 outputs a "0". Thus, a terminal PE of each presettable counter is applied with a pulse "1" through the 2-input NAND gate 89. At this time, the "25" of the preset code switch 60 is preset again in the presettable down counters 71 and 72.

The output "0" of the gate 98 is further applied to the set terminal of the seventh flip-flop 91 through an inverter 99. A command signal of 1 level is applied from the seventh flip-flop 91 to the sub-circuit B through a transistor 100 and an inverter 101. At a moment, the output of the inverter 97 is inverted into "0" to reset the seventh flip-flop 91 through a 2-input NAND gate 90. Thus, one command signal is produced. The command signal is continuously applied to a reset terminal R of the second flip-flop 73 of the sub-circuit B at every 2.5 seconds.

When the second flip-flop 73 is reset, an output at a 0 lever is applied to the one-shot pulse generating circuit 75. A one-shot pulse "1" appears at the output of the circuit 75. This one-shot pulse "1" is applied to a set terminal S of the fourth flip-flop 78 to produce an output 1 which is applied to the clock pulse generating circuit 80. The output thereof is 1000 Hz, as clock pulses. The clock pulses are applied to clock lines C of the presettable down counters 82 and 83, respectively.

The output "1" of the fourth flip-flop 78 is applied to a 3-input NAND gate 102, and three inputs thereof go to "1". The gate 102 produces an output at a 0 level which is applied to the terminal $\overline{CI}$ of the presettable down counter 82 to produce clock pulses.

Each time one clock pulse is applied to the presettable counter, the preset count therein decreases by one. When 15 clock pulses are applied to the presettable counters, both inputs of a 2-input NOR gate 103 go to a "0". Thus, the 2-input NOR gate 103 produces one read clock pulse.

The one-shot pulse "1" of the one-shot pulse generating circuit 75 is further applied to the reset terminal of the third flip-flop 76, the output 0 thereof is applied to the terminal $\overline{CE}$ of the EPROM 48 through the connector 51 and the EPROM in turn is set to an output state.

On the other hand, when the output of the 2-input NOR gate 13 goes to "1", a 2-input NAND gate 105 outputs a "0" when an inverter 104 produces output "1". Thus, terminal PE of each presettable counter is applied with a pulse "1" through the 2-input NAND gate 81. At this time, the "15" of the preset code switch 61 is preset again in the presettable down counters 82 and 83.

Thus, every time 15 clock pulses are applied to the presettable counters 82 and 83, one read clock pulse is generated from the gate 105. The read clock pulse is applied to the clock line C of a binary counter 106. Accordingly, the binary counter 106 produces outputs through address lines Q1 to Q7, so that the outputs are applied to the address in the EPROM 48 through the connector 51.

On the other hand, the EPROM 48 produces a data signal in response to the address signals, so that respective actuators for cylinders of the press machine are operated through relay unit 44.

Time of one cycle is decided by the number of read clock pulses. Operation in the case of 100 read clock pulses in one cycle will be explained hereinafter.

In order to produce the one-cycle end signal upon 100 read clock pulses, address lines Q3, Q6 and Q7 of the binary counter 106 are selected as the inputs of a 3-input NAND gate 107. Since the binary number of "100" is 1100100, when the 100th read clock pulse is applied to the input of the binary counter 106, outputs on the address lines Q3, Q6 and Q7 go to "1" and the 3-input NAND gate 107 produces a one-cycle end signal "0".

When one cycle is completed, the third flip-flop 76 is set through the 2-input NAND gate 77, so that an output 1 is applied to $\overline{CE}$ of the EPROM 48 to stop producing the output. The fifth flip-flop 84 is set through an inverter 108. A first input of the abnormality signal output gate of 2-input NAND gate 86 is changed to "1". The one cycle end signal 0 is applied to the 3-input NAND gate 102, so that a signal at the "1" level is applied to $\overline{CI}$ of the counter 82 through the gate 102. The fourth flip-flop 78 is reset through the 2-input NAND gate 79 to stop the clock pulse generating circuit 80. Thus, each of the actuators of the machine stops.

When the work product after the manufacturing process passes a sensor 40 provided at an outlet of the machine, a signal having a 0 level is applied to the set terminal of the second flip-flop 73 through an input terminal 109, chatter preventing circuit C, Schmitt circuit, inverter and 2-input NAND gate 74. The fifth flip-flop 84 is reset through 2-input NAND gate 85 to change the first input signal of the abnormality signal output gate of 2-input NAND gate 86 into a "0". Further, the second flip-flop 73 is reset by the command signal of the main circuit A at the next 2.5 seconds, thereby re-starting the operations of the sub-circuit B and actuators of the machine. The operations of the actuators are continued unless an abnormality occurs.

When a signal from the sensor 40 is not applied to the second flip-flop 73 at the end of the one cycle operation, and the command signal is applied to the second flip-flop 73, both of the inputs of abnormality signal output gate of 2-input NAND gate 86 go to "1" to produce an output "0" so that first flip-flop 66 is set. Thus, transistors 110 and 67 are turned on. The abnormality display 56 emits the light and the inverter 69 produces the output 0. A signal having 1 level which is inverted through the 3-input NAND gate 102 is applied to $\overline{CI}$ of the presettable down counter 82 to stop clock pulses. The output of the inverter 70 is changed to "1" which is applied to the presettable down counter 71 to stop the operations of both counters. The 2-input NOR gate 93 produces the output "0" to stop the clock pulse generating circuit 94. Thus, the output of the clock pulse stops and the machine completely stops.

After inspection and repair of the machine are done, the reset switch 58 is depressed and the start switch 57 is depressed, so that the machine starts operation.

In accordance with the present invention, press work and assembling are combined to provide a progressive automatic press and assembly machine. Since the press machine is formed extremely small in size, the machine can be operated on a table, thereby improving operability at a low cost.

While the invention has been described in conjunction with preferred specific embodiment thereof, it will be understood that this description is intended to illustrate and not limit the scope of the invention, which is defined by the following claims.

What is claimed is:

1. A multi-stage press and assembly machine comprising:

a pick-and-place device having first means for progressively transferring first workpieces and positioning at least one of said first workpieces in a press and assembly position, and second means for progressively transferring second workpieces and positioning at least one of said second workpieces in said press and assembly position proximate said first workpiece;

parts-feeder means for feeding at least said second workpieces one by one to said second means of said pick-and-place device;

a die set having a base plate, and vertical guide posts each having a first portion securely mounted on said base plate and a second portion disposed in a spaced relation relative to said first portion, a horizontal cylinder plate securely mounted on said second portions of said guide posts, a movable plate slidably mounted on said guide posts, a first die secured to said movable plate and a second die secured to said base plate for performing a press operation and for assembling said first and second workpieces into a workpiece assembly, said first die and said second die defining said press and assembly position therebetween;

a cylinder vertically mounted on said cylinder plate, said cylinder having a piston rod which is connected to the movable plate; and a sequence controller having means for operating at least said cylinder of said press and assembly machine and said pick-and-place device to perform a progressive press and assembly operation on said first and second workpieces said sequence controller including means for actuating said cylinder to move said first die toward said second die so as to perform said press operation on said first and second workpieces disposed in said press and assembly position and to assemble said first and second workpiece together into said workpiece assembly.

2. The press machine according to claim 1 wherein said first means of said pick-and-place device comprises, at least first and second guide rails mounted on said base plate at opposite sides of said second die, at least first and second sliding members slidably mounted on said first and second guide rails respectively, a connecting member connecting said first and second sliding members, a reciprocating cylinder for reciprocating said connected sliding members along said guide rails, and a plurality of gripping actuators provided on said first and second sliding members, each of said gripping actuators including opposing gripping cylinders and opposing gripping fingers for gripping said first workpiece, each of said gripping fingers being mounted respectively to said gripping cylinders and being operated by a piston rod of said respective gripping cylinder.

3. The press machine according to claim 2 further comprising a lifting device for lifting said pick-and-place device, said lifting device having lifting cylinders provided on said base plate, a piston rod of each of said lifting cylinders being connected to at least one said guide rail corresponding thereto for lifting said guide rail.

4. The press machine according to claim 2 wherein an inner diameter of said gripping cylinder on one of said sliding members is larger than an inner diameter of said gripping cylinder opposite thereto on the other of said sliding members.

5. A press and assembly line comprising:

a plurality of multi-stage press and assembly machines which are connected in series, each of the multi-stage press and assembly machines comprising:

a die set having a base plate, and vertical guide posts each having a first portion securely mounted on said base plate and a second portion disposed in a spaced relation relative to said first portion, a horizontal cylinder plate securely mounted on said second portions of said guide posts, a movable plate slidably mounted on said guide posts, a first die secured to said movable plate and a second die secured to said base plate said first die and said second die defining a press and assembly position therebetween;

a cylinder vertically mounted on said cylinder plate, said cylinder having a piston rod which is connected to said movable plate;

a pick-and-place device mounted on said base plate having first means for progressively transferring first workpieces and positioning at least one of said first workpieces in said press and assembly position, and second means for progressively transferring second workpieces and positioning at least one of said second workpieces in said press and assembly position proximate said first workpiece;

parts-feeder means provided for feeding said second workpieces one by one to said second means of said pick-and-place device;

a sequence controller having means for operating at least said cylinder of said press and assembly machine and said pick-and-plate device to perform a progressive press and assembly operation on said first and second workpieces, said sequence controller including means for actuating said cylinder to move said first die toward said second die so as to perform said press operation on said first and second workpieces disposed in said press and assembly position and to assemble said first and second workpiece together into said workpiece assembly.

6. A cold forging press machine operatively engaged with said press and assembly machine recited in claim 1, said cold forging press machine comprising:

a support frame which defines an inlet of said cold forging press machine and includes a slider unit supported thereby;

a bolster mounted on said support frame;

a parts-feeder provided at said inlet;

a pick-and-place device having transfer means for progressively transferring parts received from said parts-feeder and positioning at least one of said parts in a press position;

a die set having a base plate secured to said bolster of the press machine and positioned proximate said inlet so as to receive said parts from said pick-and-place device, and a movable plate secured to said slider of the press machine, said base plate and said movable plate defining said press position therebetween;

means for actuating said slider unit to move said movable plate and perform a press operation on said part disposed in said press position, each said part being formed into one of said first workpieces;

a discharge shoot engaged with said press and assembly machine which is adapted to receive and transfer said first workpieces to said pick-and-place device of said press and assembly machine disposed in a downstream direction therefrom; and a sensor provided on said discharge shoot for detecting a discharge of said first workpieces through said discharge shoot; and a sequence controller mounted on the press machine having means for controlling an operation of the cold forging press machine.

7. A power press machine operatively engaged with said press and assembly machine recited in claim 1, said power press machine comprising:

a support frame which defines an inlet of said power press machine and includes a slider unit supported thereby;

a bolster mounted on said support frame;

a parts-feeder provided at said inlet;

a pick-and-place device having transfer means for progressively transferring parts received from said parts-feeder and positioning at least one of said parts in a press position;

a die set having a base plate secured to said bolster of the press machine and positioned proximate said inlet so as to receive said parts from said pick-and-place device, and a movable plate secured to said slider of the press machine, said base plate and said movable plate defining said press position therebetween;

means for actuating said slider unit to move said movable plate and perform a press operation on said part disposed in said press position, each said part being formed into one of said first workpieces;

a discharge shoot engaged with said press and assembly machine which is adapted to receive and transfer said first workpieces to said pick-and-place device of said press and assembly machine disposed in a downstream direction therefrom; and a sensor provided on said discharge shoot for detecting a discharge of said first workpieces through said discharge shoot; and a sequence controller mounted on the press machine having means for controlling an operation of the power press machine.

8. A press and assembly line comprising:

a multi-stage progressive cold forging press machine having means for producing first workpieces and a discharge shoot through which said first workpieces pass to an outlet thereof;

a plurality of multi-stage press and assembly machines connected in series with at least one of said multi-stage press and assembly machines being connected to said cold forging press machine at said outlet of said discharge shoot, each of the press and assembly machines comprising a die set having a base plate, vertical guide posts each having a first portions securely mounted on said base plate and a second portion disposed in a spaced relation relative to said first portion, a horizontal cylinder plate securely mounted on said second portions of said guide posts, a movable plate slidably mounted on said guide posts and defining a press and assembly position between said movable plate and said base plate;

a cylinder vertically mounted on said cylinder plate, said cylinder having a piston rod which is connected to the movable plate;

a pick-and-place device mounted on said base plate having first means for progressively transferring at least one of said first workpieces to said press and assembly position, and second means for transferring at least one of a plurality of second workpieces to said press and assembly position proximate said first workpiece;

parts-feeder means provided for feeding at least said second works one by one to said pick-and-place device;

a sequence controller for operating at least said cylinder of said press and assembly machine and said pick-and-place device to perform a progressive press and assembly operation on said first and second works disposed in said press and assembly position to form a workpiece assembly, said workpiece assembly being said first workpiece for an adjacent one of said press and assembly machines.

9. The press machine according to claim 1 wherein said second means of said pick-and-place device comprises at least one second workpiece guide rail extending toward said press and assembly position, at least one second workpiece slide member slidably mounted on said first guide rail, gripper means for releasably gripping one of said second workpieces received from said parts feeder means, and a cylinder operatively engaged with said second workpiece guide rail so as to move said second workpiece slide member toward and away from said press and assembly position to place said second workpiece being gripped by said gripper means proximate said first workpiece.

10. The press machine according to claim 9 wherein said second means includes lifting means for lifting said parts feed guide rail to facilitate said positioning of said second workpieces.

11. The press machine according to claim 1 wherein said first means defines a first feed path extending to said press and assembly position and said second means defines a second feed path extending to said press and assembly position, said second feed path being transverse to said first feed path.

* * * * *

UNITED STATES PATENT AND TRADEMARK OFFICE
CERTIFICATE OF CORRECTION

PATENT NO. : 5,519,932
DATED : May 28, 1996
INVENTOR(S) : Yoshikazu KUZE

It is certified that error appears in the above-indentified patent and that said Letters Patent is hereby corrected as shown below:

Column 9, line 40; change "workpieces said" to ---workpieces, said---; and line 44; change the first occurrence of "workpiece" to ---workpieces---.

Column 10, line 21; change "plate said" to ---plate, said---; and line 47; change the first occurrence of "workpiece" to ---workpieces---.

Column 11, line 43; delete "and".

Column 12, line 5; change "portions" to ---portion---; and line 28; change "works" to ---workpieces---.

Signed and Sealed this

Fifteenth Day of April, 1997

*Attest:*

BRUCE LEHMAN

*Attesting Officer*  *Commissioner of Patents and Trademarks*